(12) United States Patent
Chen et al.

(10) Patent No.: US 12,224,981 B2
(45) Date of Patent: Feb. 11, 2025

(54) TECHNIQUES FOR ONBOARDING WEB APPLICATIONS IN A ZERO TRUST ENVIRONMENT

(71) Applicant: HEWLETT PACKARD ENTERPRISE DEVELOPMENT LP, Spring, TX (US)

(72) Inventors: Yehoshua Haim Chen, Tel Aviv (IL); Shay Farhuma Gutman, Tel Aviv (IL); Omri Himelbrand, Ramat Gan (IL); Gilad Kleinman, Tel Aviv (IL); Shay Shwartz, Tel Aviv (IL); Natan Elul, Tel Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 269 days.

(21) Appl. No.: 17/804,718

(22) Filed: May 31, 2022

(65) Prior Publication Data

US 2023/0388271 A1 Nov. 30, 2023

(51) Int. Cl.
*H04L 9/40* (2022.01)
(52) U.S. Cl.
CPC ...... *H04L 63/0236* (2013.01); *H04L 63/0263* (2013.01); *H04L 63/083* (2013.01); *H04L 63/102* (2013.01); *H04L 63/20* (2013.01)

(58) Field of Classification Search
CPC ........................................................ H04L 9/40
See application file for complete search history.

(56) References Cited

U.S. PATENT DOCUMENTS

| | | | |
|---|---|---|---|
| 9,668,137 B2 | 5/2017 | Sigurdson et al. | |
| 2013/0239177 A1* | 9/2013 | Sigurdson | H04L 63/102 726/4 |
| 2014/0289530 A1* | 9/2014 | De Waal | G06Q 10/101 709/204 |
| 2018/0316676 A1* | 11/2018 | Gilpin | H04L 9/0891 |
| 2019/0014088 A1* | 1/2019 | Subramaniyan | H04L 63/0281 |
| 2020/0117776 A1* | 4/2020 | de Souza | H04L 63/00 |

* cited by examiner

*Primary Examiner* — Khoi V Le

(57) ABSTRACT

A system and method for providing external resources through a zero trust environment includes recording a web session of a first user to generate a policy allowing a second user to access the resource used in the web session. The method includes receiving a request to initiate a network session with the zero trust environment, the request including login credentials, wherein the login credentials correspond to an authorizing user account; receiving a request to access a resource in a network environment which is external to the zero trust environment; detecting in the request a domain associated with the resource; and configuring a policy engine of the zero trust environment to generate a policy allowing network traffic between the domain and a designated user account, based on the received request.

18 Claims, 5 Drawing Sheets

TECHNIQUES FOR ONBOARDING WEB APPLICATIONS IN A ZERO TRUST ENVIRONMENT

TECHNICAL FIELD

The present disclosure relates generally to web applications, and specifically to providing services of web applications through a zero-trust computing environment.

BACKGROUND

Computing devices are becoming increasingly prevalent and as users demand flexibility in where they work and how, more organizations offer bring-your-own-device (BYOD) policies, and allow users to work physically outside of the organization. This is in addition to users who have traditionally worked outside the organization, such as travelling sales representatives, remote technicians, etc.

This flexibility and ability to work outside of the organization possess several cybersecurity risks. It is difficult to manage a large number of devices where the organization cannot enforce policies for those devices, such as keeping software and operating systems up to date, verifying users for authentication purposes, and the like. Any misconfiguration or other vulnerability which a user is responsible for may pose a threat to the entire organization.

To address these issues, zero trust architectures have been proposed. A computing environment having a zero-trust architecture, also referred to as a zero trust computing environment, operates on the principle that no device, application, user, etc. can be trusted.

However, implementing a zero-trust architecture comes with certain disadvantages. Constantly requiring users to provide verifications and perform authentications results in an interruption to the user. Further, a computing environment which allows users to complete only certain actions may be found frustrating. When a user experience is bad, users tend to circumvent these measures, or end up not using the systems the measures are put in place to protect.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing external resources through a zero trust environment. The method comprises: receiving a request to access a resource in a network environment which is external to the zero trust environment; detecting in the request a domain associated with the resource; and configuring a policy engine of the zero trust environment to generate a policy allowing network traffic between the domain and a designated user account, based on the received request.

Certain embodiments disclosed herein also include a non-transitory computer readable medium having stored thereon causing a processing circuitry to execute a process, the process comprising: receiving a request to access a resource in a network environment which is external to the zero trust environment; detecting in the request a domain associated with the resource; and configuring a policy engine of the zero trust environment to generate a policy allowing network traffic between the domain and a designated user account, based on the received request.

Certain embodiments disclosed herein also include a system for providing external resources through a zero trust environment. The system comprises: a processing circuitry; and a memory, the memory containing instructions that, when executed by the processing circuitry, configure the system to receive a request to access a resource in a network environment which is external to the zero trust environment; detect in the request a domain associated with the resource; and configure a policy engine of the zero trust environment to generate a policy allowing network traffic between the domain and a designated user account, based on the received request.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
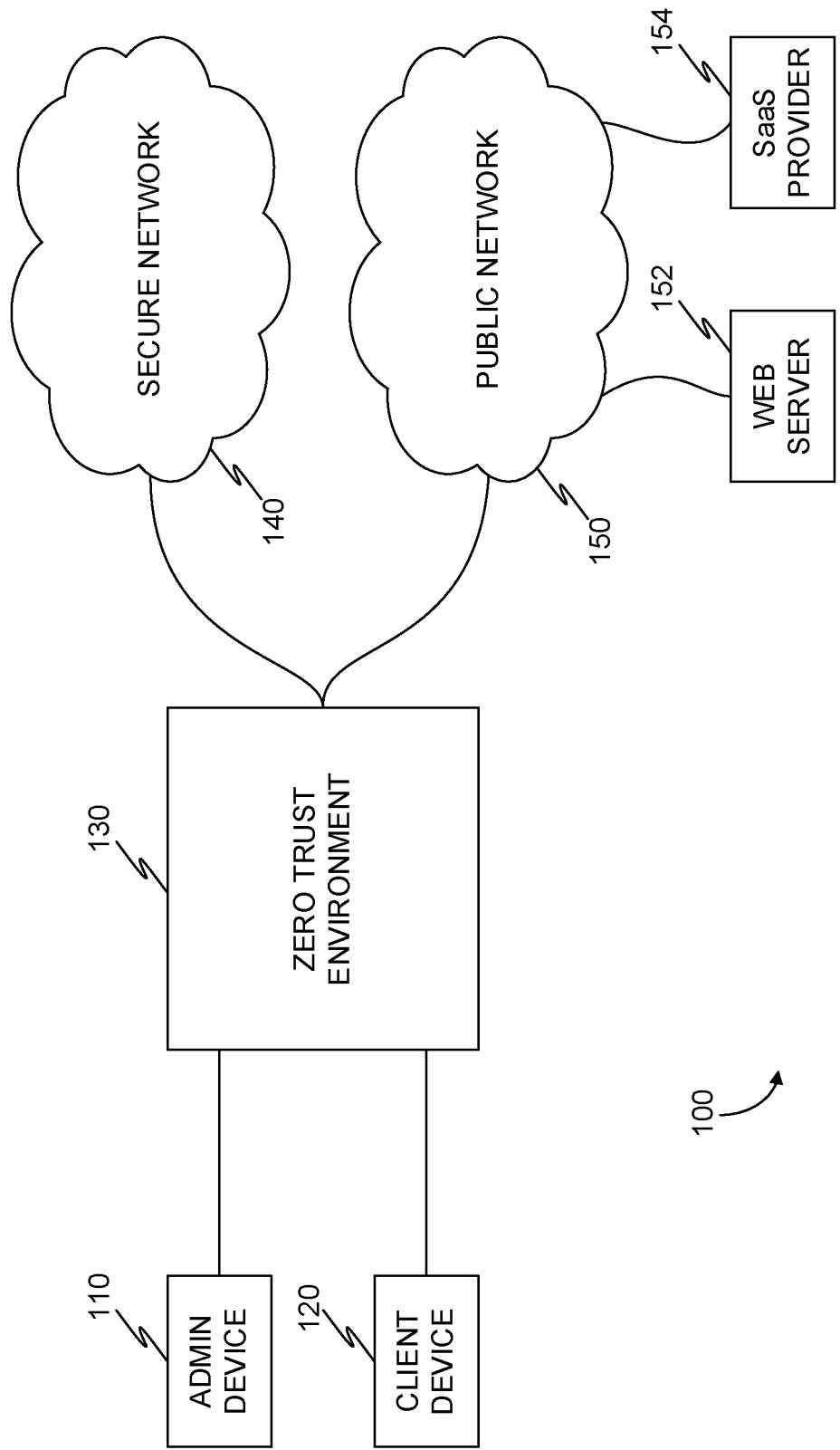
FIG. 1 is a network diagram utilized to describe the various embodiments disclosed herein.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for onboarding web applications, software as a service (SaaS) services, and the like, which are provided through a zero-trust computing environment. An administrator device connects to the zero-trust computing environment, and requests a connection to a resource, such as through a uniform resource locator (URL). The zero-trust computing environment records actions performed by the administrator device with respect to the resource, for example by monitoring what URL requests are received, and stores the monitored actions. A rule is generated based on an action performed by the administrator device, and the rule is used by the zero-trust computing environment to direct network traffic from a client device, which is not the administrator device, in order to determine from the administrator device what the client device is authorized to do.

FIG. 1 is an example network diagram 100 utilized to describe the various embodiments disclosed herein. An administrator (admin) device 110 is communicatively coupled with a zero-trust environment 130. The zero-trust environment 130 is further connected with a plurality of client devices, such as client device 120 (also referred to interchangeably as user device 120). The zero-trust environment 130 provides connectivity between a secure network 140 and user devices, such as the admin device 110 and client device 120. In an embodiment, a user device may be, but is not limited to, a personal computer, a laptop, a tablet computer, a smartphone, a wearable computing device, or any other device capable of receiving and displaying notifications, and otherwise interacting with network resources. Network resources may be for example, SaaS services, web applications, and the like.

The zero-trust environment 130 further provides connectivity between a user device and a public network 150. In an embodiment, the public network 150 includes, but is not limited to, a wireless, cellular or wired network, a local area network (LAN), a wide area network (WAN), a metro area network (MAN), the Internet, the worldwide web (WWW), similar networks, and any combination thereof. The zero-trust environment 130 is discussed in more detail with respect to FIG. 2 below. In an embodiment, the zero-trust environment 130 may be implemented as a cloud computing environment. For example, a cloud computing environment may be a virtual private cloud (VPC) deployed in a cloud computing infrastructure. A cloud computing infrastructure may be, for example, Amazon® Web Services (AWS), Microsoft® Azure, Google® Cloud Platform (GCP), and the like.

The secure network 140 is a networked computing environment. In an embodiment, the secure network 140 may be implemented as a VPC on a cloud computing infrastructure. The secure network 140 may include resources such as web servers, application servers, SSH servers, remote desktop protocol (RDP) servers, and the like. The secure network 140 may be operated by an organization. The organization utilized the zero-trust environment 130 to provide connectivity between user devices of user of the organization, to the secure network 140. Thus, users which are physically external to the secure network 140 may still access the resources thereof, while reducing the threat of cybersecurity vulnerabilities and exploitations.

The public network 150 provides access to various public resources. A public resource may be a resource which is not provided by the organization, such as web-based email services (e.g., Gmail®), web-based CRM solutions (e.g., Salesforce®), and the like. Users may wish to use such services while they are connected to the secure network 140 through the zero-trust environment 130. For example, a user having a client device 120 which is connected to the secure network 140 through the zero-trust environment 130 may want to concurrently user their personal Gmail account to check their email.

In an embodiment, the zero-trust environment 130 does not allow public network access to a user device, unless explicitly authorized by an administrator. One objective of this disclosure is to provide a convenient method for an administrator to authorize web applications, SaaS services, and the like for use by a user of the organization, connecting to the organization through the zero trust environment 130. In certain embodiments, an administrator may provide temporary administrator privileges to a user account which is not an administrator account, for example to allow a user to authorize a domain on which a web application is hosted, such as detailed below. In certain embodiments, the administrator device may add a time limit to a network session during which the user account may define a domain and authorized web application corresponding thereto. The user account may be referred to as a designated user account, where the user account is designated to use the web application.

When a user device 120 connects to the zero trust environment 130, an authentication occurs between a user account and the zero trust environment 130. In an embodiment, the authentication may further be based on the user device 120. Authentication may be performed, for example, based on an identifier of a user account (such as user account name), device name, device MAC address, a token, a shared secret, a multifactor authentication scheme, and the like. A network communication session is initiated between the client device 120 and the zero trust environment 130, such that all communication between the client device 120 and another networked device or resource are directed, or configured to be redirected, to the zero trust environment 130. This is discussed in further detail below.

Figure 2:
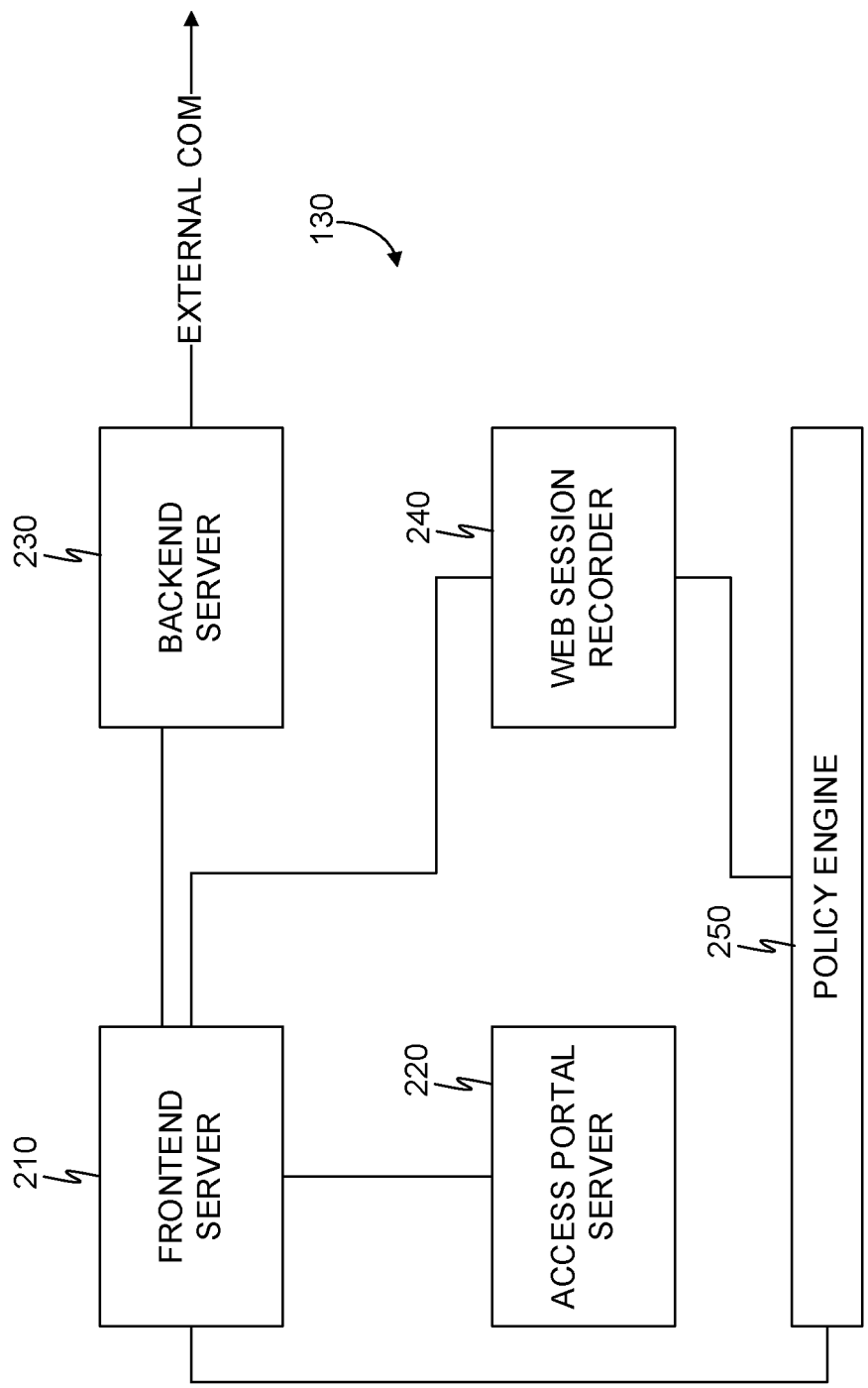
FIG. 2 is a diagram of a zero trust environment, implemented in accordance with an embodiment.

FIG. 2 is an example diagram of a zero trust environment 130, implemented in accordance with an embodiment. The zero trust environment 130 may be implemented as a VPC in a cloud computing infrastructure. The zero trust environment 130 includes therein a frontend server 210, an access portal server 220, a backend server 230, a web session recorder 240, and a policy engine 250. In an embodiment, any of: the frontend 210, the access portal server 220, the backend server 230, the web session recorder 240, and the policy engine 250 may be implemented as a virtual instance, or a group of virtual instances. A virtual instance may be, for example, a virtual machine, a container, a serverless function, and the like. A virtual machine may be implemented as Oracle® VirtualBox™. A container may be implemented as a Docker® Engine, a Kubernetes® Engine, as a container in Amazon® Elastic Container Service (ECS), and the like. A serverless function may be, for example, Amazon Lambda.

The access portal server 220 provides user identification and provides a user device with instructions which when executed by the user device configure the user device to display a user interface which allows a user to interact with the zero trust computing environment. For example, the user interface may include a plurality of icons, wherein interacting with an icon (e.g., clicking on the icon) configures the user device to initiate a connection through the zero trust computing environment with an application, service, and the like. In an embodiment, the user access portal server 220 is configured to receive login credentials from a user device (such as client device 120), and is further configured to verify, authenticate, or both, using the login credentials. In certain embodiments, the user access portal server 220 is configured to provide the login credentials to a third party authentication service. A third-party authentication service may be, for example, Okta®.

The frontend server 210 is configured to communicate, for example over a TCP/IP network protocol, with a user device, such as client device 120 of FIG. 1 above. The frontend server 210 is further configured to communicate with the backend server 230. The backend server 230 communicates with resources external to the zero-trust environment 130. For example, in an embodiment the backend sever 230 communicates with a connector deployed in a secure network, such as the secure network 140 of FIG. 1 above. In certain embodiments, the backend server 230 communicates with external resources such as web applications, SaaS providers, and the like.

When a user is verified, the frontend server 210 may determine what web applications, resources, and the like, are exposed to the user through the zero trust environment 130. The user may then initiate communication with, for example, a web application selected by the user. The communication is initiated through the zero trust environment 130. In an embodiment, the frontend server 210 may query a policy engine 250 to determine what access should be granted to a user. For example, the frontend server 210 may send the policy engine 250 a user identifier, such as a username role, attribute, and the like, and receive from the policy engine 250 a policy which should be applied to network traffic received from, and sent to, the user (i.e., sent to the user device of the user). In an embodiment, a policy is based on eXtensible Access Control Markup Language (XACML), which defines attribute based access control to resources.

In some embodiments, the frontend server 210 is configured to receive an access request from an administrator account, for example through an administrator device (or admin device). In an embodiment, an admin account is a user account associated with an administrator role. The administrator role includes the highest privilege (i.e., access) available for a secure network. The admin account can define certain applications, servers, services, and the like, to be accessible to a user account, which is not an admin account. For example, the admin account can define a role which is stored in the policy engine 250. In an embodiment a role includes a rule which defines access for a user account associated with the role. The role may include a plurality of rules.

In certain embodiments, an administrator may wish to allow users of the organization to interact only with certain elements of a resource. For example, if the resource is a web server, the administrator may want to define only certain actions which are allowed (e.g., clicking on certain other URLs) and have others which are not. The frontend server 210 provides network traffic generated by the admin device to the web session recorder 240. The web session recorder 240 stores events based on interactions of the admin device with an external resource. For example, the web session recorder 240 (also referred to as recorder 240) may generate an event, including a request received from an admin device to access a resource based on a URL.

The resource may include a hypertext markup language (HTML) page, which includes therein a plurality of interactive elements, such as links, and other resources, such as text, pictures, videos, multimedia content, and the like. The URL includes a domain, such as www.example.com. The HTML page to which the URL points to, may include therein a URL (e.g., link) which points to a domain which is not www.example.com.

In order to maintain communication with the zero-trust environment, a URL rewrite may be performed, for example by the frontend server 210. The frontend server 210 may receive the HTML page, detect another URL which points to another HTML page of the example.com domain. The frontend server 210 then performs a rewrite of the HTML page, to redirect the another URL to a domain of the zero trust network. For example, the another URL may originally point to www.example.com/about/info.html and the rewritten URL is redirected to examplecom.zte.com/about/info.html. This allows communication to continue between a user device and the zero trust environment while generating a unique URL which the frontend server can resolve to obtain the resource from the original URL. In an embodiment, resolving a rewritten URL may be performed based on rules which are used to rewrite the original URL. In another embodiment, resolving a rewritten URL may be performed by storing each original URL with a rewritten URL, for example in a lookup table.

Certain resources may be external to the domain of the requested resource. For example, the HTML page which is located at www.example.com may require images stored on www.images.com/example in order to properly display. Thus, if an admin authorizes the domain example.com, web pages will not display correctly due to lack of access to images.com. The admin may not be aware that certain resources require resources situated outside of the authorized domain.

The web session recorder 240 detects resources which are actively requested by the admin device, based on the network traffic. In the example above, when an admin device requests a URL containing the HTML page, the HTML page including a request for a resource which is not in the domain of the HTML page, the recorder 240 will generate an event indicating that the admin device requested a resource from the URL and any other dependent requests. In certain embodiments, a resource may include dependent resources, e.g., pictures, videos and the like, and independent resources, such as links to other resources. An independent resource is not fetched automatically, rather, a user needs to actively indicate (for example by clicking) that the resource is requested.

In an embodiment, the web session recorder 240 is configured to generate network traffic rules stored in the policy engine 250 based on the network session of the admin. In some embodiments, the web session recorder 240 generates a list of all the domains which the admin interacted with in the network session. The list may be adapted to a policy stored on the policy engine 250. In some embodiments, the web session recorder 240 may generate a first list containing therein domains which were actively accessed, and a second list containing therein domains which were present (e.g., as a link in an HTML document) but were not actively engaged with. The domains on the second list are resources which a user, or another resource, could have requested, but did not request during the network session.

In this regard, it is recognized that a human may define rules manually and insert them into a rule engine, for example by providing them as textual input. However, these rules are not generated consistently because they are generated based on what a person imagines a user would be required to do, and other subjective evaluations. This requires a human to imagine an entire workflow of how a user interacts with a large number of interactive elements, such as links, buttons, and the like, and figure for each of these what actions are allowed and which are not. In addition, there are often resource elements which may be external to environment, such as a web applications which calls a third party plugin, which is required for the web application to function, and which the user is not even aware of.

Consequently, any attempt to generate rules for defining access to network resources fail, or are successful despite providing the rule engine with subjective criteria. The disclosed embodiments avoid this inconsistent rule generation by using objective criteria based on monitoring network traffic received from an admin interacting with a network resource. The result is that access rules for a resource are generated based on objective criteria rather than user-based guesses, resulting in consistent rule generation, a smooth process for defining such access, and reducing the risk of failing to specify hidden actions (e.g., dependent resources as noted above).

Figure 3:
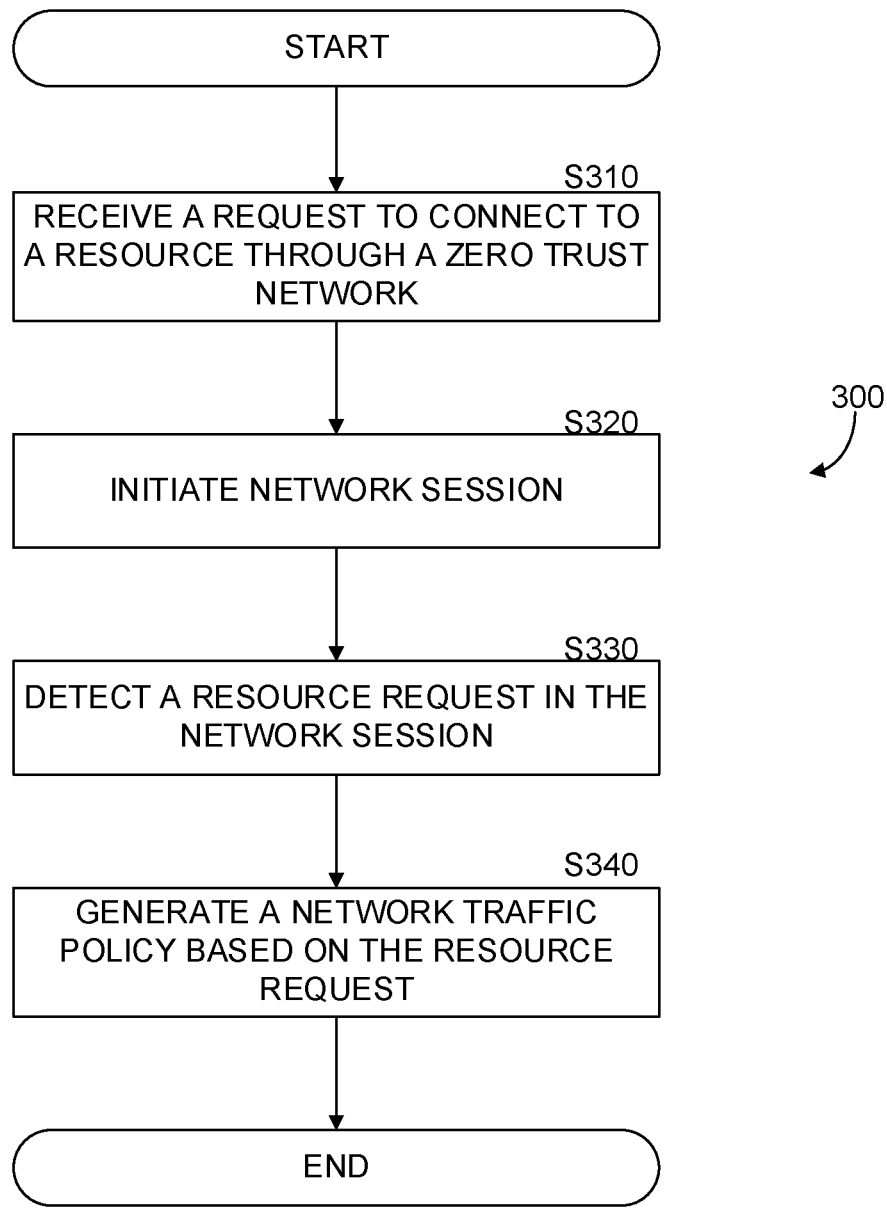
FIG. 3 is a flowchart of a method for generating a network traffic policy in a zero-trust environment, implemented according to an embodiment.

FIG. 3 is an example flowchart 300 of a method for generating a network traffic policy in a zero-trust environment, implemented according to an embodiment.

At S310, a request is received to connect to a resource through a zero-trust environment. The request is received from a client device, operated by a user having a user account. In an embodiment, the request is received after a user account is verified by the zero-trust network. In some embodiments, verifying a user account includes, for example, performing a multi-factor authentication, receiving login credentials, receiving a password, passcode, passphrase, and the like. The request is generated by a designated user account (also referred to as an authorizing user). In an embodiment, the designated user account is an administrator account, or a user account associated with a role, or other permissions, which allow the user account to define a network traffic flow between users of the zero-trust environment and a resource. The resource may be, for example, a web application, a SaaS service, and the like.

In some embodiments, a designated user account may further indicate that the request includes an instruction to allow network traffic between at least another user, and the resource. For example, the instruction may include an identifier of the at least another user, identifiers of a group of users, an identifier of a role, and the like.

In an embodiment, the resource is accessed using a uniform resource locator (URL). The URL of the resource includes a domain. In some embodiments, the designated user account may select a resource from a list of preapproved resources. For example, the designated user account may select a web application from preapproved web applications, such as Google® Gmail®, Microsoft® Hotmail®, Yahoo!® Mail, etc. A preapproved resource may include a predetermined list of domains requiring approval in order to fully utilize the resource. In an embodiment, the resource may be deployed in a public network, in a secure network, or any combination thereof.

At S320, a network session is initiated between the zero-trust environment and the client device. Another network session is initiated based on the request, between the zero-trust environment and the resource. For example, a network session is initiated between the client device and a frontend server of the zero-trust environment, and another network session is initiated between a backend server and a resource, such as a web application hosted by a third party. The frontend server and backend server are both deployed in the zero-trust environment and are communicatively coupled with one another.

In an embodiment, a network session includes receiving a request to access a resource at a URL. The resource is fetched from the URL, and is inspected for additional resource requests. For example, an HTML page is a resource which may include additional resource requests. In an embodiment, an additional resource request may be dependent or independent of the resource request. A dependent request is a request which is executed when the resource is used. For example, when an HTML page is viewed (i.e., used) the HTML page may include markup language which when executed by a browser configure a client device executing the browser to request additional content. For example, an HTML page from a first domain may request multimedia content, such as an advertisement content, from a second domain.

An independent request is a request which is only executed in response to receiving a request from a user to fetch the resource. For example, a URL link requires that a user provide an input, such as a mouse click, in order to instruct a client device to generate a request for the content which is associated with the URL link.

In some embodiments, the network session has a defined start time and a defined end time. The end time may be defined by a user input, for example a user providing an indication that the network session ends. In other embodiments, the end time may be a predefined time, which is relative to the defined start time. For example, the end time may be 15 minutes measured from the start time.

At S330, a resource request is detected in the network session. In an embodiment, the network session, or a portion thereof, may be recorded. For example, an event may be generated based on a received request for content, a URL request, and the like. In certain embodiments, a plurality of resource requests may be detected, where a first resource request is different from a second resource request. For example, a first resource request may be for a dependent resource, and a second resource request may be for an independent resource.

A resource request includes a domain name from which the resource is requested. In certain embodiments, a list may be generated, including a domain name of the resource request. In other embodiments, the list may include a domain name which is associated with an independent request, and another domain name associated with a dependent request. In certain embodiments, a first list may include a domain name which is associated with an independent request, and a second list includes a domain name associated with a dependent request.

In an embodiment detecting a resource request includes searching a resource request for predefined indicators (e.g., 'http', 'https', 'ftp', etc.). In certain embodiments detecting a resource request includes receiving a resource, such as an HTML page, and searching content of the resource for resource requests.

In some embodiments, a resource request may be classified as an active resource request. An active resource request is a request which was received as a result of an action or instruction initiated by the user account of the user. For example, a user clicking on a link is an active resource request, while an HTML page loading content from a third party server to supply advertising is not an active request for content. In an embodiment, the request for the HTML page may be an active resource request, while the dependent request for the third party content is not an active request (i.e., a passive request).

In certain embodiments, a URL detected in a content (or other resource) may be rewritten to direct a user to the domain of the zero trust network. For example, a detected URL may be www.example.com/about/info.html and the rewritten URL is redirected to examplecom.zte.com/about/info.html. This allows communication to continue between a user device and the zero trust environment while generating a unique URL which can be resolved to obtain the resource from the original URL. In an embodiment, resolving a rewritten URL may be performed based on rules which are used to rewrite the original URL. In another embodiment, resolving a rewritten URL may be performed by storing each original URL with a rewritten URL, for example in a lookup table.

At S340, a policy is generated based on the detected resource request. In an embodiment, the policy includes a rule. The rule may include a condition. For example, the policy may include a condition that specifies that requests for content from the domain associated with the resource of the detected request are permissible for user accounts having a predefined role.

In some embodiments, the policy is generated based on a generated list. In certain embodiments, a plurality of policies may be generated, each based on a generated list. In certain embodiments, a policy may be generated which allows network traffic to domains for which an active resource request was detected. Another policy may be generated to block network traffic to domains for which a passive resource request was detected. In some embodiments, a list of domains associated with passive resource requests may be provided to a designated user. The designated user may select a group of domains from the list of domains associated with the passive resource requests, which are designated as authorized domains. A policy may be generated for the authorized domains, to allow network traffic to flow thereto. In an embodiment, a policy may be implemented as a table, wherein each row includes any one of: a domain, IP address, MAC address, and the like network identifiers, and an indicator, the indicator indicating if network traffic is permitted or denied. Each row in the table corresponds to a policy. For example, a row may include the domain example.com with an indicator of 'permit', which permits users to send and receive content from the domain example.com.

In certain embodiments, a policy may further include a user identifier, role identifier, ingress permission, egress permission, and the like. A user identifier (or user role) allows limiting a policy to a specific user (or group of users). An ingress permission indicates if network traffic is allowed in an ingress direction, while an egress permission indicates if network traffic is allowed in an egress direction.

Figure 4:
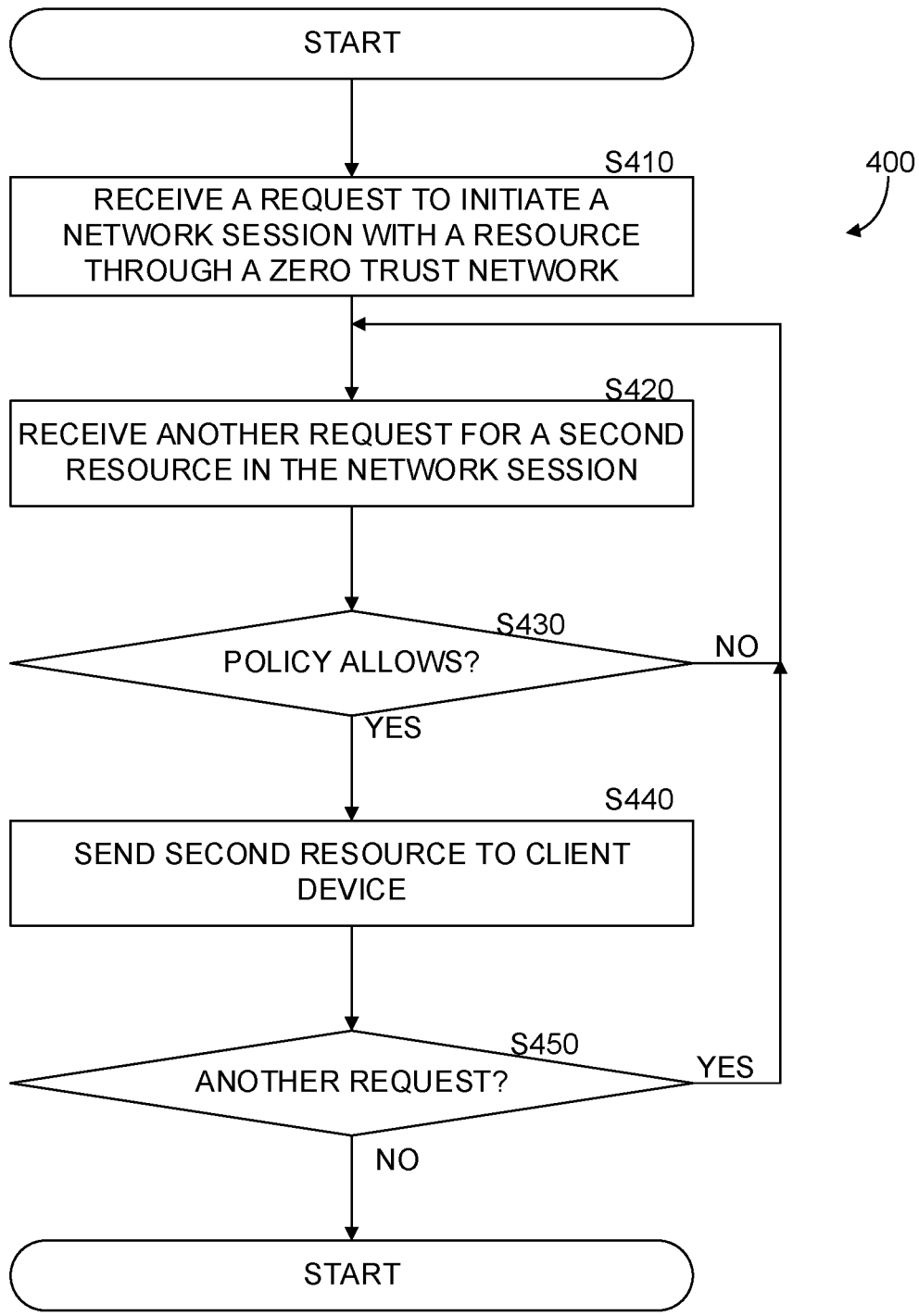
FIG. 4 is a flowchart of a method for providing external resources through a zero trust environment, implemented according to an embodiment.

FIG. 4 is an example of a flowchart 400 of a method for providing external resources through a zero trust environment, implemented according to an embodiment.

At S410, a request is received to initiate a network session with a resource through a zero trust environment. The request is received from a client device, operated by a user having a user account. The user account is not an administrator account, and cannot define network traffic flow. The resource may be, for example, a web application, a SaaS service, and the like.

In an embodiment, the user account is verified by the zero trust network. In some embodiments, verifying a user account includes, for example, performing a multi-factor authentication, receiving login credentials, receiving a password, passcode, passphrase, and the like.

At S420, a request is received to fetch content from the resource. In an embodiment, the request is received as part of the network session. For example, the request may be a hypertext transfer protocol (HTTP) GET request to fetch a content, such as an HTML page, from a URL. In some embodiments, the request includes a rewritten URL, for exampled as discussed above. In an embodiment a rewritten URL may be resolved into the original URL in order to perform the method.

At S430, a check is performed to determine if a policy allows execution of the received request. For example, a domain name may be extracted from the URL (or rewritten URL), and compared to a policy to determine if the policy allows network traffic to and from the domain. In some embodiments, a policy may limit network traffic to a domain. For example, a policy may indicate any type of network traffic is allowed, may indicate HTTP traffic is allowed, may indicate only HTTPS is allowed, and the like.

If the policy allows network traffic to the domain execution continues at S440. If the policy does not allow network traffic to the domain execution may continue at S420, or in another embodiment, execution may terminate. In yet other embodiments, where a policy does not allow traffic to the domain, a client device may be directed to an error web page.

At S440, a content is provided to the client device. In some embodiments, the content is the requested content. In other embodiments, a modified content may be generated and provided to the client device. A modified content may include, for example, rewritten URLs. A content may be searched to detect URLs which have a domain which is external to a domain of the zero trust environment. By clicking on such a URL a client device is directed away from the zero trust environment, which is not desirable.

When a URL having an external domain is detected in the content, the URL may be rewritten to a second URL corresponding to a domain which is internal to the zero trust environment. The modified content which includes a rewritten URL ensures the user is provided with the content requested, while the network session with the zero trust environment remains uninterrupted.

For example, the URL having an external domain name may originally point to www.example.com/about/info.html and the rewritten URL (i.e., second URL) is redirected to examplecom.zte.com/about/info.html where zte.com is the domain of the zero trust environment.

A unique URL is thus generated which can be resolved to obtain the content from the original URL having the external domain. In an embodiment, resolving a rewritten URL may be performed based on rules which are used to rewrite the original URL. In another embodiment, resolving a rewritten URL may be performed by storing each original URL with a rewritten URL, for example in a lookup table. The request, when executed, may configure the zero trust environment to fetch a resource (or content) from an authorized domain.

At S450, a check is performed to determine if another request is received in the network session. If 'yes' execution continues at S420, otherwise execution terminates. In some embodiments, a request to terminate the network session may be received.

While HTML pages are used throughout as an example of a content or resource which can be fetched, it should be apparent that other technologies, markup languages, code, and the like may be used with the teachings of the disclosure.

Figure 5:
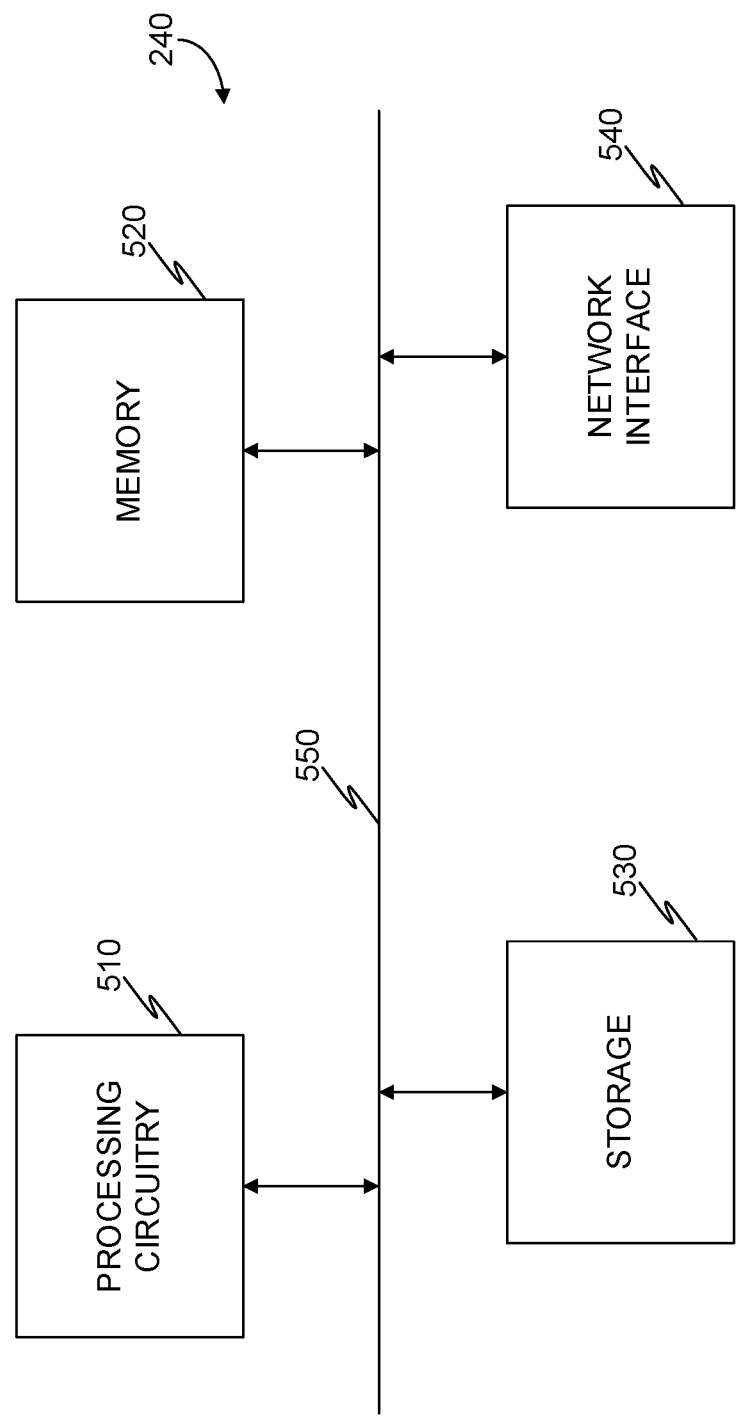
FIG. 5 is a schematic diagram of a web session recorder according to an embodiment.

FIG. 5 is an example schematic diagram of a web session recorder 240 according to an embodiment. The web session record 240 (or simply recorder 240) includes a processing circuitry 510 coupled to a memory 520, a storage 530, and a network interface 540. In an embodiment, the components of the recorder 240 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, or any other medium which can be used to store the desired information.

The network interface 540 allows the recorder 240 to communicate with, for example, the policy engine 250, frontend server 210, and the like.

It should be understood that the embodiments described herein are not limited to the specific architecture illustrated in FIG. 5, and other architectures may be equally used without departing from the scope of the disclosed embodiments. Moreover, a similar computer architecture such as the one described above may be utilized for the policy engine 250, frontend server 210, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
   receiving, at a system comprising a hardware processor, a request from an authorizing user device to initiate a network session with a zero trust environment, the request including a login credential corresponding to an authorizing user account;
   recording, at the system, an interaction between the authorizing user device and a resource external to the zero trust environment, the interaction based on an access request of the authorizing user device to access the resource;
   detecting, by the system, a domain associated with the resource accessed by the authorizing user device;
   generating, by the system, a policy based on the recording of the interaction, the policy comprising a rule specifying a condition under which a designated user account different from the authorizing user account is permitted access to the domain; and
   using, by a policy engine, the policy to determine whether to grant a designated user device associated with the designated user account access to the domain in response to a request from the designated user device, wherein the designated user account is assigned a privilege from the authorizing user device, the privilege allowing the designated user account to generate the request from the designated user device.

2. The method of claim 1, further comprising:
   detecting in the access request a further domain associated with the resource; and
   generating, by the system, another policy blocking network traffic between the further domain and the designated user account.

3. The method of claim 1, wherein the generating of the policy further comprises:
   creating a list of domains that the authorizing user device interacted with as part of the network session, wherein the policy refers to one or more conditions under which the designated user account is permitted access to the domains in the list of domains.

4. The method of claim 3, wherein the list of domains is a first list of domains actively requested by the authorizing user device based on actions of an authorizing user of the authorizing user device, and wherein the generating of the policy further comprises:

creating a second list of one or more domains not actively requested by the authorizing user device during the network session, wherein the policy blocks access to the domains in the second list of one or more domains by the designated user account.

5. The method of claim 1, wherein the access request includes a uniform resource locator (URL) comprising the domain.

6. The method of claim 5, further comprising:
fetching content based on the URL;
detecting in the content a second URL, the second URL having a domain which is not the domain of the URL; and
rewriting the content to replace the second URL with a further URL, wherein the further URL includes a domain of the zero trust environment.

7. The method of claim 6, wherein the further URL further includes a unique subdomain which is generated based on the domain of the second URL.

8. The method of claim 6, further comprising:
receiving a request to fetch content based on the rewritten content;
resolving the further URL to the second URL;
fetching content based on the second URL; and
providing the content based on the second URL to the authorizing user device through the zero trust environment.

9. A non-transitory computer readable medium comprising instructions that upon execution cause a system to:
receive a request from an authorizing user device to initiate a network session with a zero trust environment, the request including a login credential corresponding to an authorizing user account;
record an interaction between the authorizing user device and a resource external to the zero trust environment, the interaction based on an access request of the authorizing user device to access the resource;
detect a domain associated with the resource accessed by the authorizing user device;
generate a policy based on the recording of the interaction, the policy comprising a rule specifying a condition under which a designated user account different from the authorizing user account is permitted access to the domain; and
use, by a policy engine, the policy to determine whether to grant a designated user device associated with the designated user account access to the domain in response to a request from the designated user device, wherein the designated user account is assigned a privilege from the authorizing user device, the privilege allowing the designated user account to generate the request from the designated user device.

10. The non-transitory computer readable medium of claim 9, wherein the generating of the policy further comprises:
creating a list of domains that the authorizing user device interacted with as part of the network session, wherein the policy refers to one or more conditions under which the designated user account is permitted access to the domains in the list of domains.

11. The non-transitory computer readable medium of claim 10, wherein the list of domains is a first list of domains actively requested by the authorizing user device based on actions of an authorizing user of the authorizing user device, and wherein the generating of the policy further comprises:
creating a second list of one or more domains not actively requested by the authorizing user device during the network session, wherein the policy blocks access to the domains in the second list of one or more domains by the designated user account.

12. A system for a zero trust environment, comprising:
processing circuitry; and
a non-transitory storage medium storing instructions executable by the processing circuitry to:
receive a request from an authorizing user device to initiate a network session with the zero trust environment, the request including a login credential corresponding to an authorizing user account;
record an interaction between the authorizing user device and a resource external to the zero trust environment, the interaction based on an access request of the authorizing user device to access the resource;
detect a domain associated with the resource accessed by the authorizing user device;
generate a policy based on the recording of the interaction, the policy comprising a rule specifying a condition under which a designated user account different from the authorizing user account is permitted access to the domain; and
use, by a policy engine, the policy to determine whether to grant a designated user device associated with the designated user account access to the domain in response to a request from the designated user device, wherein the designated user account is assigned a privilege from the authorizing user device, the privilege allowing the designated user account to generate the request from the designated user device.

13. The system of claim 12, wherein the instructions are executable by the processing circuitry to further:
detect in the access request a further domain associated with the resource; and
generate another policy blocking network traffic between the further domain and the designated user account.

14. The system of claim 12, wherein the generating of the policy further comprises:
creating a list of domains that the authorizing user device interacted with as part of the network session, wherein the policy refers to one or more conditions under which the designated user account is permitted access to the domains in the list of domains.

15. The system of claim 14, wherein the list of domains is a first list of domains actively requested by the authorizing user device based on actions of an authorizing user of the authorizing user device, and wherein the generating of the policy further comprises:
creating a second list of one or more domains not actively requested by the authorizing user device during the network session, wherein the policy blocks access to the domains in the second list of one or more domains by the designated user account.

16. The system of claim 12, wherein the access request includes a uniform resource locator (URL) comprising the domain, and the instructions are executable by the processing circuitry to further:
fetch content based on the URL;
detect in the content a second URL, the second URL having a domain which is not the domain of the URL; and
rewrite the content to replace the second URL with a further URL, wherein the further URL includes a domain of the zero trust environment.

17. The system of claim 16, wherein the further URL further includes a unique subdomain which is generated based on the domain of the second URL.

18. The system of claim 16, wherein the instructions are executable by the processing circuitry to further:
  receive a request to fetch content based on the rewritten content;
  resolve the further URL to the second URL;
  fetch content based on the second URL; and
  provide the content based on the second URL to the authorizing user device through the zero trust environment.

* * * * *